United States Patent
Huang et al.

(10) Patent No.: US 8,196,155 B2
(45) Date of Patent: Jun. 5, 2012

(54) XML-BASED EVENT DRIVEN INTERFACE FOR OPC DATA ACCESS

(75) Inventors: Qiming Huang, Palo Alto, CA (US); Honghao Zhou, Shenzhen (CN)

(73) Assignee: Oracle International Corporation, Redwood Shores, CA (US)

(*) Notice: Subject to any disclaimer, the term of this patent is extended or adjusted under 35 U.S.C. 154(b) by 910 days.

(21) Appl. No.: 12/247,495

(22) Filed: Oct. 8, 2008

(65) Prior Publication Data

US 2010/0114994 A1    May 6, 2010

(51) Int. Cl.
*G06F 13/00* (2006.01)
(52) U.S. Cl. .................................. 719/328; 719/318
(58) Field of Classification Search ............... 719/318, 719/328
See application file for complete search history.

(56) References Cited

U.S. PATENT DOCUMENTS

| | | | |
|---|---|---|---|
| 7,043,532 B1* | 5/2006 | Humpleman et al. | 709/208 |
| 7,805,533 B2* | 9/2010 | Burns et al. | 709/230 |
| 2003/0028671 A1* | 2/2003 | Mehta et al. | 709/245 |
| 2008/0114872 A1* | 5/2008 | Fisher et al. | 709/224 |
| 2008/0211632 A1* | 9/2008 | Horowitz | 340/10.1 |

* cited by examiner

*Primary Examiner* — Andy Ho
(74) *Attorney, Agent, or Firm* — Kilpatrick Townsend & Stockton LLP

(57) ABSTRACT

Communication from applications may be carried in XML-based events through sockets, Web services, JMS, HTTP, telnet channels, and the like to an OPC client. The OPC client may include an event engine configured to process the XML-based events, and convert them to appropriate COM/DCOM API invocations. In some embodiments, the OPC client buffers collected data from the COM/DCOM API, and transmits the buffered data in an XML event to an application based on a subscription time schedule and/or value condition. The OPC client allows service oriented event-driven applications to interact with industry devices remotely via the open architecture provided by the OPC specification using a business level language syntax.

20 Claims, 8 Drawing Sheets

XML-BASED EVENT DRIVEN INTERFACE FOR OPC DATA ACCESS

BACKGROUND OF THE INVENTION

The present invention relates to industrial automation. More specifically, the present invention relates to an XML-based event driven interface for OPC Data Access.

OPC or Open Connectivity provides open standards specifications developed for communication of real-time data between control devices from different manufacturers. In general, OPC is a series of standards specifications. The first standard (originally called the "Object Linking and Embedding (OLE) for Process Control" OPC Specification"), is generally called the Data Access Specification, or "OPC Data Access."

The OPC Specification is based on the OLE, common object model (COM), and distributed COM (DCOM) technologies developed by Microsoft for the Microsoft Windows operating system family. The specification defines a standard set of objects, interfaces, and methods for use in process control and manufacturing automation applications to facilitate interoperability (hereinafter the OPC Data Access interface).

OPC servers typically provide a method for many different software packages to access data from a process control device, such as a process or programmable logic controller (PLC) or distributed control system (DCS). Traditionally, any time an application needed access to data from a device, a custom interface, or driver, had to be written. The purpose of OPC was to define a common interface or API that is written once and then reused by different software packages. Once an OPC server is written for a particular device, it can be reused by any application that is able to act as an OPC client.

However, traditionally, the OPC interface has been restricted to the Microsoft COM/DCOM framework. Automation applications written with in other languages, such as Java™/J2EE™, especially in service oriented event-driven architectures cannot access the OPC Data Access interface in a direct and straightforward manner as OPC clients. This limitation complicates the development of components that link enterprise software to industry devices. Thus, many enterprise software packages do not have access to industry devices, and data exchange is done through a manual process.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

The present invention relates to industrial automation. More specifically, the present invention relates to an XML-based event driven interface for OPC Data Access.

In general, communication from applications are carried in XML-based events through sockets, Web services, JMS, HTTP, telnet channels, and the like to an OPC client. The OPC client may include an event engine configured to process the XML-based events, and convert them to appropriate COM/DCOM API invocations. In some embodiments, the OPC client buffers collected data from the COM/DCOM API, and transmits the buffered data in an XML event to an application based on a subscription schedule. The OPC client allows service oriented event-driven applications to interact with industry devices remotely via the open architecture provided by the OPC specification using a business level language syntax.

In various embodiments, techniques can be provided for communicating with a device. In response to receiving an XML event from an application, a set of calls for an interface associated with a device may be determined based on the XML event. The set of determined calls may be then invoked to control the device. Determining the set of calls for the interface may include translating the XML event into one or more calls in the set of calls.

In some embodiments, data may be received in response to controlling the device. At least one of a time interval, for a time-based subscription, or value condition may be examined. Another XML event may then be generated based on the data. The generated XML event may be transmitted to the application, such as based on the time-based subscription or value condition. In further embodiments, determining the set of calls for the interface may include determining a plurality of calls. Data for each call in plurality of calls may be received in response to controlling the device. An XML event may then be generated based on aggregating the data for each call in the plurality of calls.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

In various embodiments, a system for OPC Data Access allows service-oriented event-driven applications to interact with industry devices remotely via the OPC architecture using a business level language syntax. In general, communications to and from applications are carried in XML-based events through sockets, Web services, JMS, HTTP, telnet channels, and the like. To control devices remotely, the applications send XML events to an OPC client that processes the XML-based events and converts them to appropriate calls or invocations of the interfaces associated with the device. In some embodiments, the OPC client buffers collected data from the calls, and asynchronously transmits the buffered data in an XML event to an application based on a subscription schedule. In various embodiments, the OPC client aggregates results from different calls into an XML event for transmission to an application.

Figure 1:
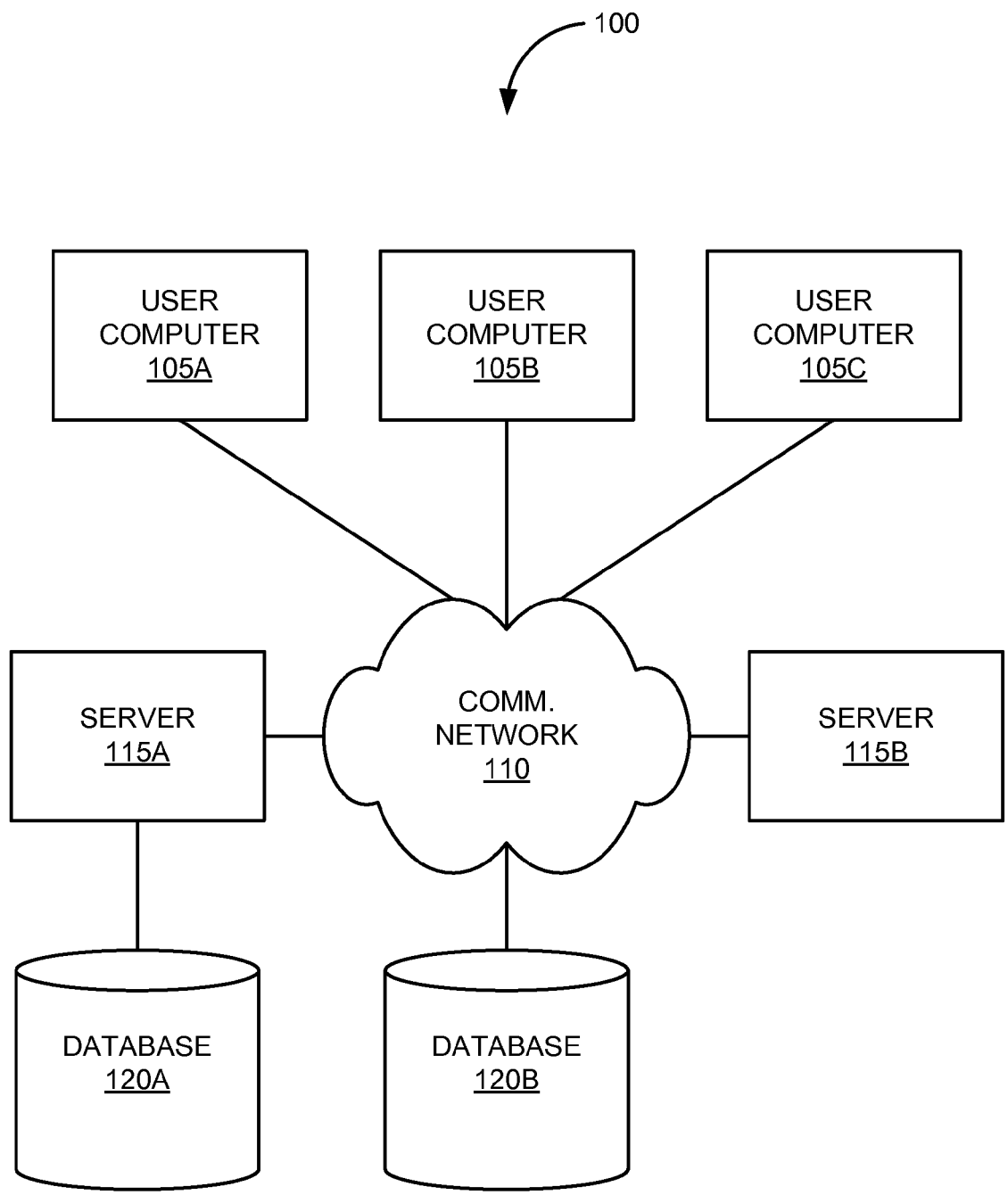
FIG. 1 is a block diagram of a system that may incorporate embodiments of the present invention.

FIG. 1 is a simplified illustration of system 100 that may incorporate embodiments of the present invention. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 105 (e.g., computers 105A, 105B, and 105C). User computers 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 105 can also have any of a variety of applications, including one or more applications configured to perform methods of the invention, as well as one or more office applications, database client and/or server applications, and web browser applications.

Alternatively, user computers 105 can be any other electronic device, such as a thin-client computer, Internet-enabled mobile telephone, and/or personal digital assistant, capable of communicating via a network (e.g., communications network 110 described below) and/or displaying and navigating web pages or other types of electronic documents. Although the exemplary system 100 is shown with three user computers, any number of user computers can be supported.

Certain embodiments of the invention operate in a networked environment, which can include a communications network 110. Communications network 110 can be any type of network familiar to those skilled in the art that can support data communications using any of a variety of commercially-available protocols, including without limitation TCP/IP, SNA, IPX, AppleTalk, and the like. Merely by way of example, communications network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., computers 115A and 115B). Each of server computers 115 may be configured with an operating system including without limitation any of those discussed above, as well as any commercially-available server operating systems. Each of server computers 115 may also be running one or more applications, which can be configured to provide services to one or more clients (e.g., user computers 105) and/or other servers (e.g., server computers 115).

Merely by way of example, one of server computers 115 may be a web server, which can be used, merely by way of example, to process requests for web pages or other electronic documents from user computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 105 to perform methods of the invention.

Server computers 115, in some embodiments, might include one ore more file and or/application servers, which can include one or more applications accessible by a client running on one or more of user computers 105 and/or other server computers 115. Merely by way of example, one or more of server computers 115 can be one or more general purpose computers capable of executing programs or scripts in response to user computers 105 and/or other server computers 115, including without limitation web applications (which might, in some cases, be configured to perform methods of the invention).

Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on one of user computers 105 and/or another of server computer 115.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to a user computer 105 via a web server (as described above, for example). Similarly, a web server might receive web page requests and/or input data from one of user computers 105 and/or forward the web page requests and/or input data to an application server.

In accordance with further embodiments, one or more of server computers 115 can function as a file server and/or can include one or more of the files necessary to implement methods of the invention incorporated by an application running on a user computer 105 and/or another server 115. Alternatively, as those skilled in the art will appreciate, a file server can include all necessary files, allowing such an application to be invoked remotely by one or more of user computers 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120A and 120B). The location of the database(s) 120 is discretionary: merely by way of example, a database 120A might reside on a storage medium local to (and/or resident in) server computer 115A (and/or one or more of user computers 105). Alternatively, a database 120B can be remote from any or all of user computers 105 and server computers 115, so long as it can be in communication (e.g., via communications network 110) with one or more of these. In a particular set of embodiments, databases 120 can reside in a storage-area network ("SAN") familiar to those skilled in the art. (Likewise, any necessary files for performing the functions attributed to user computers 105 and server computers 115 can be stored locally on the respective computer and/or remotely, as appropriate). In one set of embodiments, one or more of databases 120 can be a relational database, such as an Oracle database, that is adapted to store, update, and retrieve data in response to SQL-formatted commands. Databases 120 might be controlled and/or maintained by a database server, as described above, for example.

Figure 2:
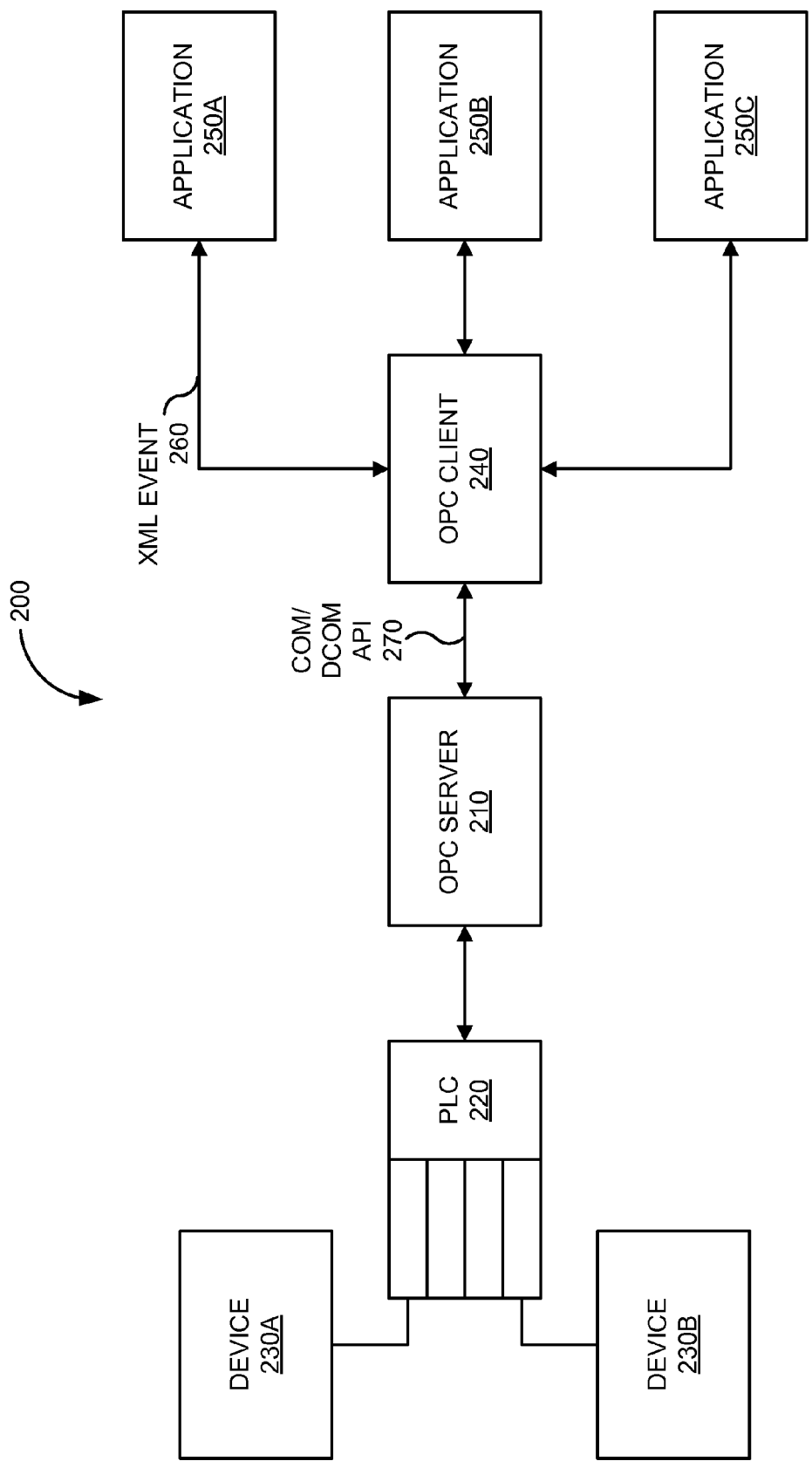
FIG. 2 is a block diagram of a system for providing an XML-based event driven interface for OPC Data Access in one embodiment according to the present invention.

FIG. 2 is a block diagram of system 200 for providing an XML-based event driven interface for OPC Data Access in one embodiment according to the present invention. System 200 includes OPC server 210, PLC 220, devices 230 (e.g., devices 230A and 230B), OPC client 240, and one or more applications 250 (e.g., applications 250A, 250B, and 250C).

OPC server 210 is any hardware and/or software elements, such as personal computers and/or laptop computers running any appropriate flavor of Microsoft Corp.'s Windows™, that act as an application programming interface (API) or protocol converter to devices 230. In general, OPC server 210 connects to PLC 220 and translates device data into a standard format (e.g., the OPC data format). Some examples of PLC 220 are process or programmable logic controllers, distributed control systems (DCSs), remote terminal units (RTUs), data source such as a database, human machine interfaces (HMIs), and the like, and other devices that communicate data using telemetry. Some examples of devices 230 are temperature sensors, humidity sensors, voltage sensors, barcode readers, RFID readers, and the like. Applications can connect to OPC server 210 and use it to read and write device data.

OPC client 240 is any hardware and/or software elements, such as personal computers and/or laptop computers running any appropriate flavor of Microsoft Corp.'s Windows™, that receive XML events and translate the XML events into one or more calls or invocations of an API associated with OPC server 210. OPC client 240 also listens to the OPC Server 210 to receive and store the data collected from device 230, and disseminate the data to Application 250. OPC client 240 may be embodied as a PC, a workstation, a server, an embedded device, and the like. OPC client 240 may also be embodied as a module of a larger application or service.

Applications 250 are any hardware and/or software elements that communicate with OPC client 240 using XML events. Some examples of applications 250 are enterprise resource planning (ERP) applications, process control applications, inventory applications, and the like.

In general, an XML event is any communication, message, or instruction presented according to the extensible markup language (XML) that controls a device, as well as any data formatted according to the extensible markup language (XML) that are collected from a device. An instruction XML event may specify the names of one or more devices, device identifiers, location from which to read data or write data, when to read/write data, and the like. A data XML event may specify the name of the device, device identifiers, location from which to read data or write data, when to read or write data, the data value read, the measurement unit of data read, the status of data writing, and the like. Events may be expressed in other languages, such as the HyperText Markup Language (HTML).

In one example of synchronous operation, application 250A generates an XML event 260 and forwards the event to OPC client 240. Application 250A may communicate XML event 260 to OPC client 240 using sockets, Web services, java message services (JMS), HyperText Transport protocol (HTTP), telnet, and the like. OPC client 240 translates XML event 260 into one or more method calls or procedure invocations using COM/DCOM API 270 to communicate with OPC server 210. In response to calling COM/DCOM API 270, OPC server 210 reads/writes device data associated with devices 230 and returns the results, if any, to OPC client 240. OPC client 240 translates the results into an XML event and forwards the XML event to application 250A.

In another asynchronous operation, application 250B generates an XML subscription event 260 and forwards the event to OPC client 240. OPC client 240 translate XML subscription event into one or more method calls or procedure invocations using COM/DCOM API 270 to communicate with OPC Server 210. In response, OPC Server 210 periodically collects data from PLC 220, which communicates with the device 230. pass the data to OPC client 240. Upon condition matched, OPC Server 210 passes the collected data to OPC client 240, which translates the results into an XML data event and forwards the XML data event to application 250A.

Accordingly, system 200 provides a flexible and simplified programming approach for applications to access industry devices through open and standard channels. Communications with devices are represented in business level XML events. Additionally, communications may be conducted in an asynchronous event-based mode.

Figure 3:
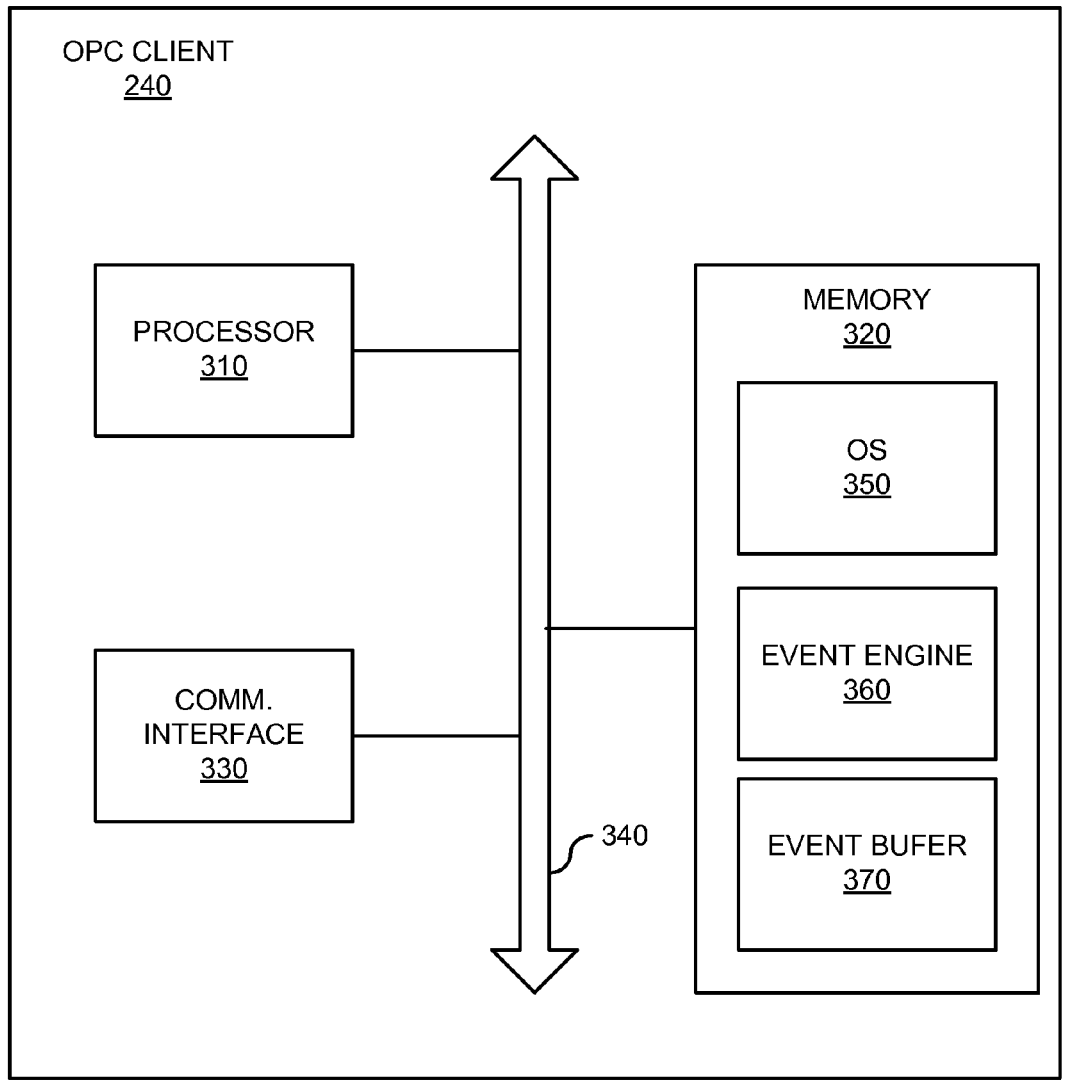
FIG. 3 is a block diagram of an OPC client for translating XML-based events in one embodiment according to the present invention.

FIG. 3 is a block diagram of OPC client 240 for translating XML-based events in one embodiment according to the present invention. In this example OPC client 240 includes processor 310, memory 320, communications interface 330, and system bus 340. System bus 340 allows processor 310, memory 320, and communications interface 330 to communicate.

Memory 320 includes operating system (OS) 350, event engine 360, and event buffer 370. OS 350 is any software that controls the execution of computer programs and applications and may provide various services and access to hardware devices. Event engine 360 is any software that translates information into one or more calls to or invocations of an API and translates the results of calls to or invocations of the API to a format readable by another application. Event buffer 370 is the memory space for temporarily storing data, which are collected by devices in multiple rounds and forwarded to applications in batch based on the data subscription contract.

Figure 4:
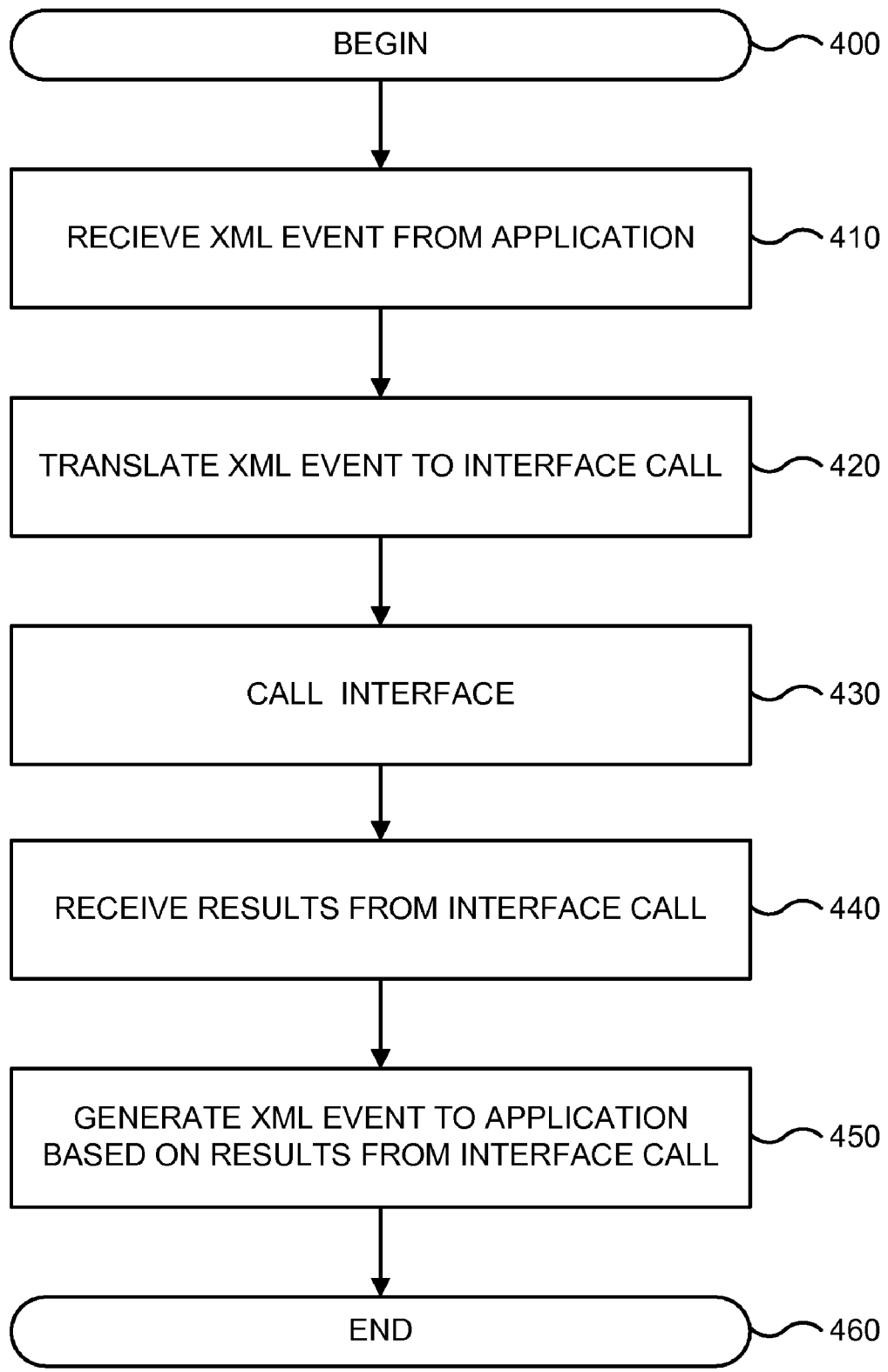
FIG. 4 is a flowchart of a method for translating XML event into OPC API calls in one embodiment according to the present invention.

FIG. 4 is a flowchart of a method for translating XML event into OPC API calls in one embodiment according to the present invention. The processing depicted in FIG. 4 may be performed by software modules (e.g., instructions or code) executed by processor 310 of OPC client 240, by hardware modules, or combinations thereof. FIG. 4 begins in step 400.

In step 410, an XML event is received from an application. In step 420, the XML event is translated into one or more interface calls. In various embodiments, the transformation is performed by a C++ program which parses the XML event to identify device ID, data subscription predicate, data collection frequency, data request application, etc. This C++ program then, based on the XML semantics, invokes the proper COM/DCOM calls and passes the proper argument data.

In step 430, the interface is called. For example, an OPC Server COM/DCOM interface is called from an OPC client. In step 440, results are received from the interface call. For example, the OPC client receives the results from the OPC Server COM/DCOM interface.

In step 450, an XML event is generated based on the results from the interface call. For example, an XML event including device ID, data collection timestamp, data value, unit, etc., may be generated based on the results of the OPC Server COM/DOCM interface call. The XML event is then passed to a requesting application. Through this approach, applications may be able to access industry devices, such as sensors and readers, through open, standard and service-oriented channels. FIG. 4 ends in step 460.

Figure 5:
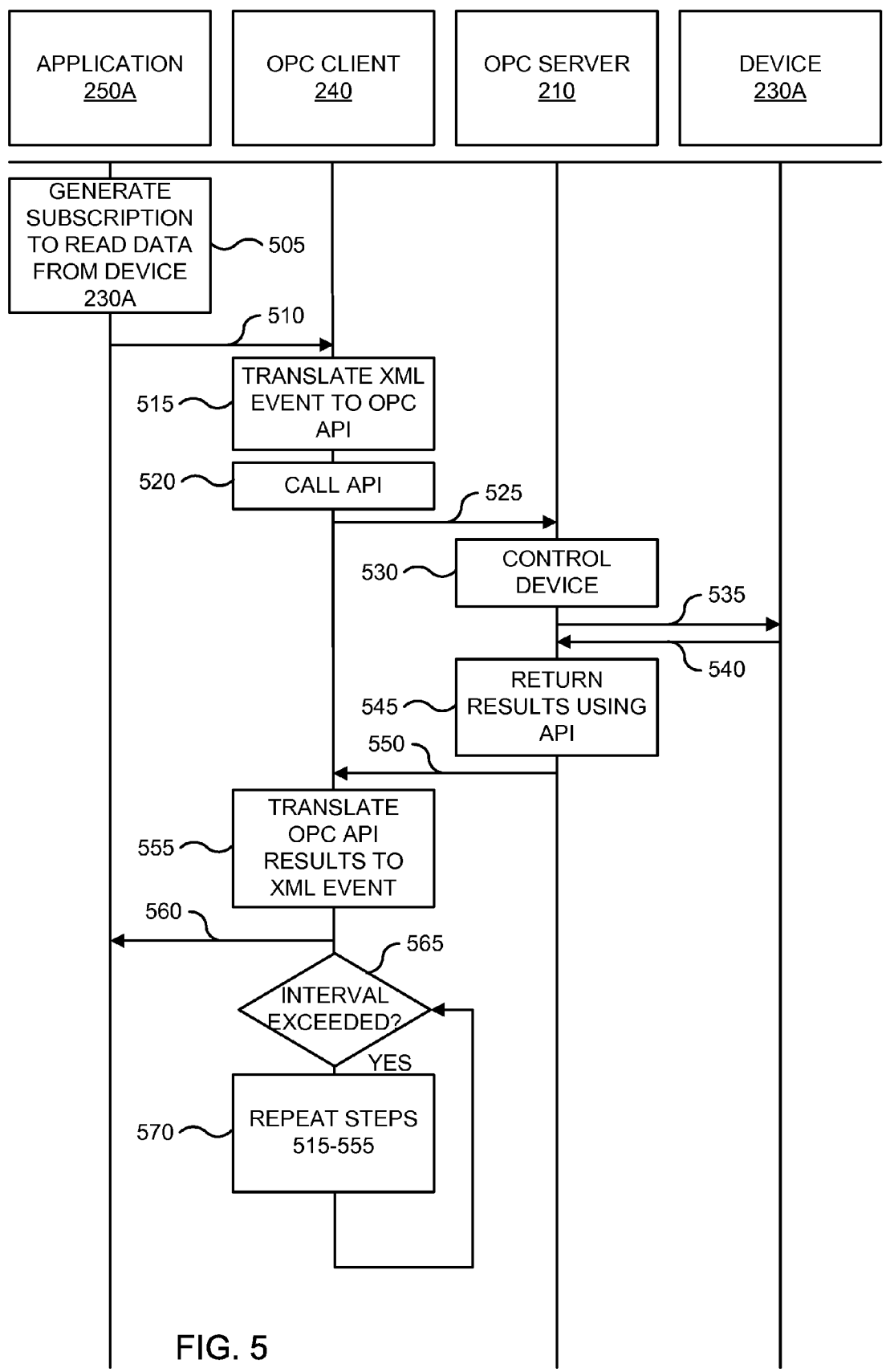
FIG. 5 is a message sequence chart illustrating communications between an application and a device in one embodiment according to the present invention.

FIG. 5 is a message sequence chart illustrating communications between application 250A of FIG. 2 and device 230A in one embodiment according to the present invention.

In block 505, application 250A generates a subscription to receive data from device 230 every five minutes. In general, a time-based subscription defines or otherwise specifies when an application would like to read and/or write data to a device. In other words, the subscription configures OPC client 240 to invoke the OPC API at predetermined intervals using calls specified by the subscription and to return the results (e.g., the read data) to the application. The subscription may define a set interval or the interval may be supplied by a default value. In another situation, value-based subscription defines or otherwise specifies what data value or value range triggers data read and/or write by an application. In this case, the subscription configures OPC client 240 read data from device using calls specified by subscription, and to return the result to the application and/or write a specified data to the device, such as when the data value or value range is met.

Application 250A then forwards or otherwise transmits XML event 510 indicative of the subscription to OPC client 240. In block 515, OPC client 240 translates the XML event to one or more OPC API calls. In block 520, OPC client 240 invokes the set of OPC API calls 525 with OPC server 210.

In block 530, OPC server 210 controls (e.g., read/write data from/to) device 230A in response to OPC API calls 525. In this example, OPC server 210 sends a request 535 (e.g., one or more input parameters) to device 230A. In response, device 230A sends a response 540 (e.g., output data read based on the input parameters) to OPC server 210.

In block 545, OPC server 210 returns any results 550 from controlling device 230A to OPC client 240. At this point, OPC Client 240 may determine whether a time interval or value condition defined by a subscription has been met. If met, for example, in block 555, OPC client 240 translates results 550 from the set of OPC API calls 525 into XML event 560. OPC client 240 forwards XML event 560 to application 250A. Application 250A can use or otherwise process the data read from device 230A. In some embodiments, after forwarding the result event, the steps from 540 to 545 may be repeated. If there is new requests from the application 250A, the steps from 505 to 555 may be repeated in parallel with the process of the current requests in a multi-thread environment.

In one embodiment, in block 565, OPC client 240 determines whether the interval defined by the subscription has been exceeded. For example, application 250A may request to receive data from a temperature sensor every five minutes. After every five-minute interval, OPC client 240 invokes the OPC API to retrieve temperature sensor data from a temperature sensor. OPC client 240 may buffer the collected data, or immediately return the collected data to application 250A after every five-minute interval. If the interval has been exceeded in block 565, in block 570, the process in blocks 520 to 555 is repeated and the any updated data is sent to application 250A in XML event 560.

Figure 6A:
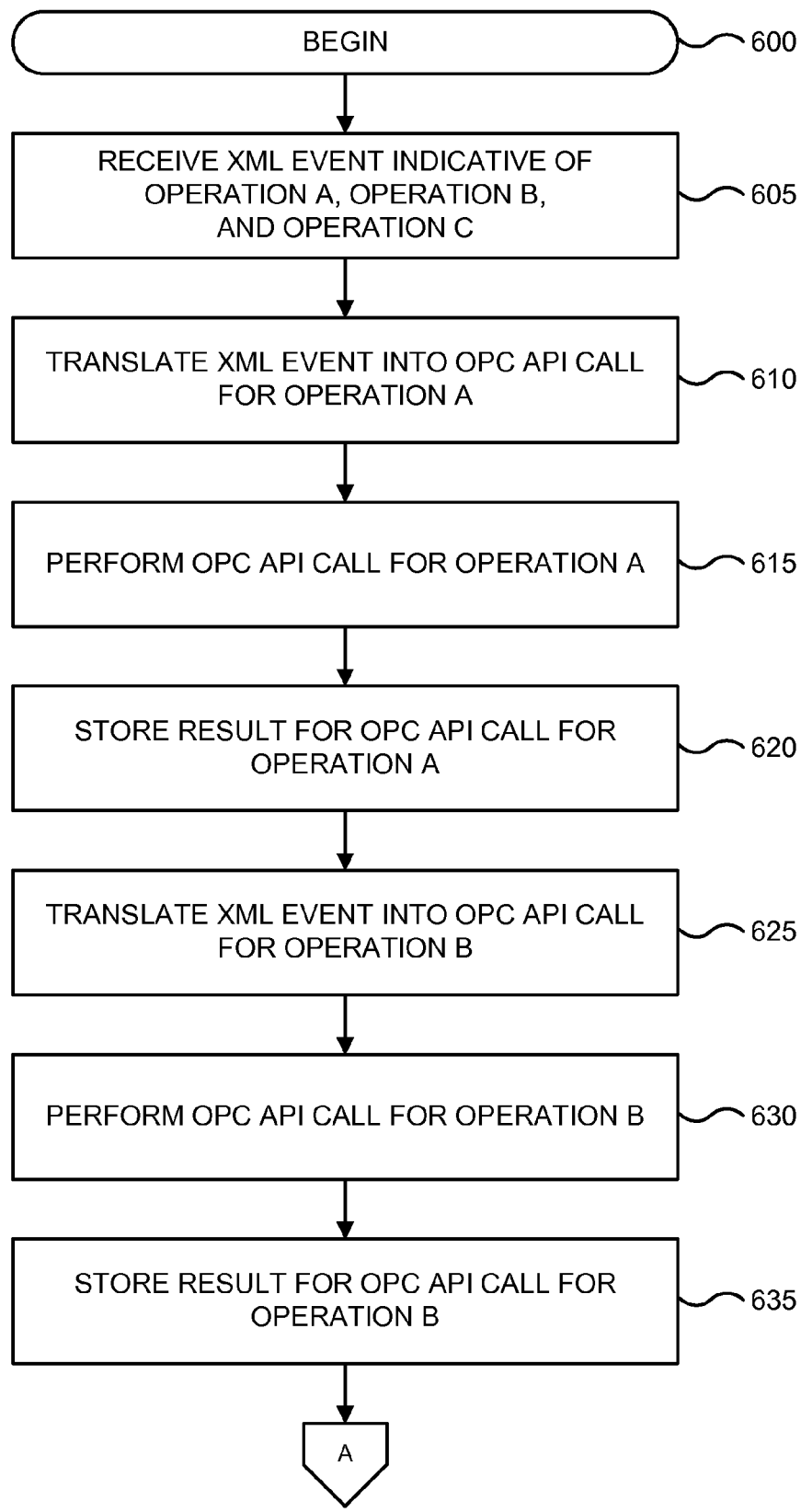
FIGS. 6A and 6B are a flowchart of a method for aggregating results of multiple OPC API calls in one embodiment according to the present invention.
Figure 6B:
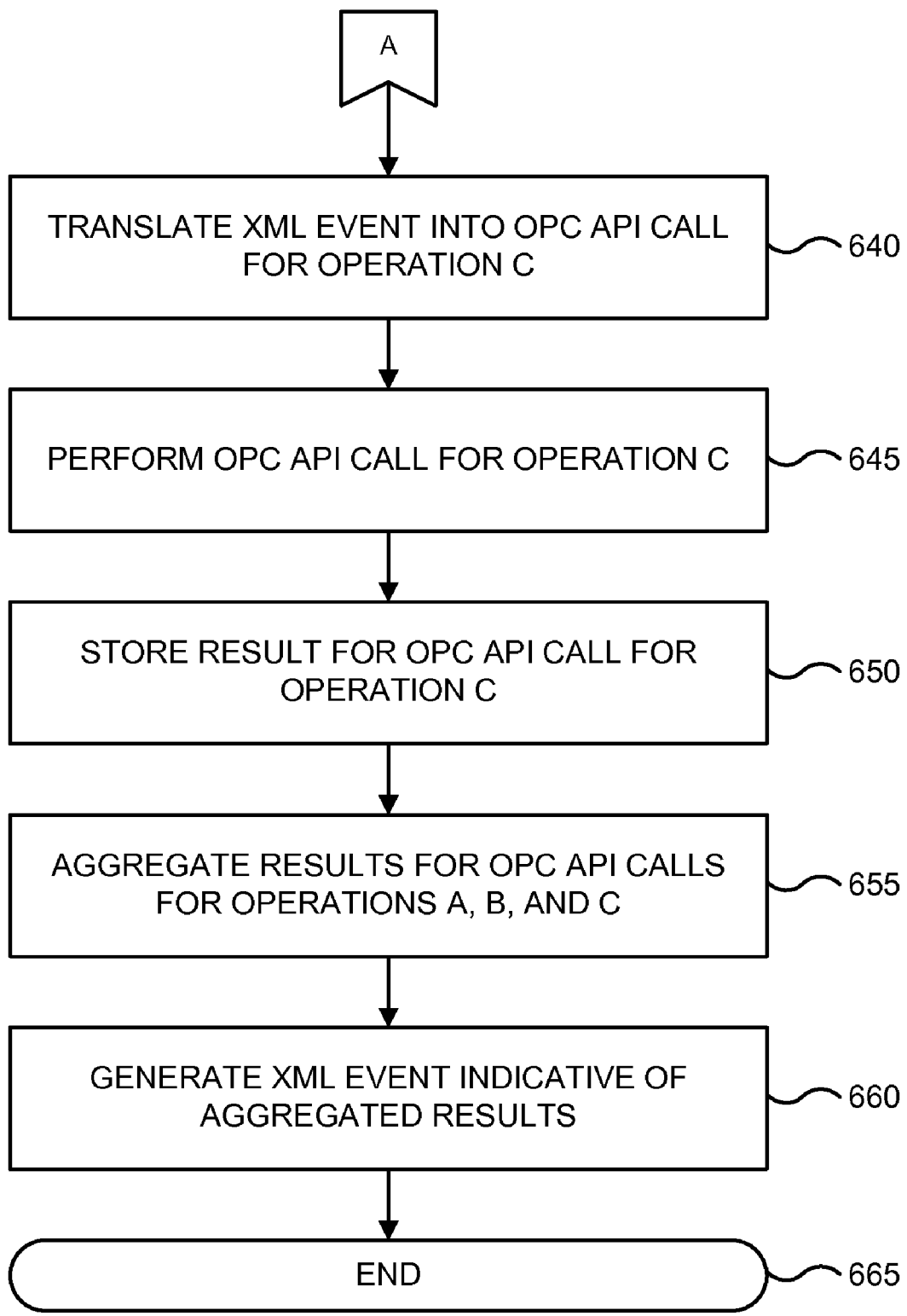

FIGS. 6A and 6B are a flowchart of a method for aggregating results of multiple OPC API calls in one embodiment according to the present invention. FIG. 6A begins in step 600.

In step 605, an XML event is received indicative of operation A, operation B, and operation C. For example, the XML event may include a read from a first device, a read from a second device, and a write to a third device.

In step 610, the XML event is translated into one or more OPC API calls for operation A. In step 615, the one or more OPC API calls for operation A are performed. In step 620, any results for the OPC API calls for operation A are stored.

In step 625, the XML event is translated into one or more OPC API calls for operation B. In step 630, the one or more OPC API calls for operation B are performed. In step 635, any results for the OPC API calls for operation B are stored.

Referring to FIG. 6B, in step 640, the XML event is translated into one or more OPC API calls for operation C. In step 645, the one or more OPC API calls for operation C are performed. In step 650, any results for the OPC API calls for operation C are stored.

In some embodiments, the result for OPC API calls for operations A, B, and C are examined. If the time interval or value condition defined by a subscription is met, for example, in step 655, the results for OPC API calls for operations A, B, and C, are aggregated. In step 660, and XML event indicative of the aggregated results is generated. Accordingly, the aggregated event can be forwarded to an application. FIG. 6B ends in step 665.

Accordingly, an application may make a single request to read/write from multiple devices. Additionally, a single response may be provided that aggregates the results from the multiple devices. In various embodiments, data collected from one or more devices may be buffered and forwarded to an application in an XML event, for example, once a week, twice a day, every hour, and the like.

Figure 7:
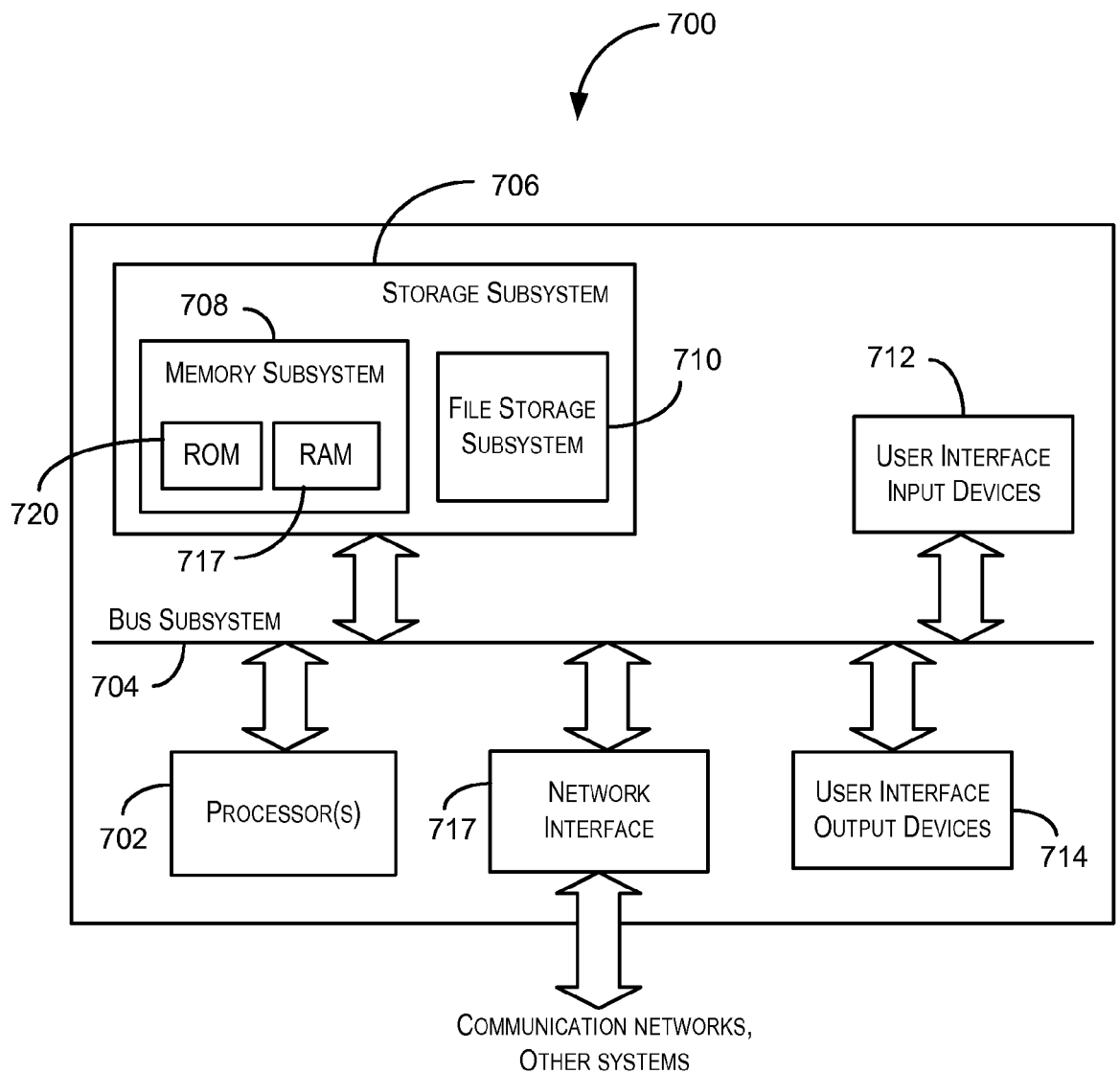
FIG. 7 is a block diagram of a computer system that may be used to practice embodiments of the present invention.

FIG. 7 is a simplified block diagram of a computer system 700 that may be used to practice embodiments of the present invention. As shown in FIG. 7, computer system 700 includes a processor 702 that communicates with a number of peripheral devices via a bus subsystem 704. These peripheral devices may include a storage subsystem 706, comprising a memory subsystem 708 and a file storage subsystem 710, user interface input devices 712, user interface output devices 714, and a network interface subsystem 716.

Bus subsystem 704 provides a mechanism for letting the various components and subsystems of computer system 700 communicate with each other as intended. Although bus subsystem 704 is shown schematically as a single bus, alternative embodiments of the bus subsystem may utilize multiple busses.

Network interface subsystem 716 provides an interface to other computer systems, and networks, and devices. Network interface subsystem 716 serves as an interface for receiving data from and transmitting data to other systems from computer system 700.

User interface input devices 712 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 700.

User interface output devices 714 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 may be configured to store the basic programming and data constructs that provide the functionality of the present invention. Software (code modules or instructions) that provides the functionality of the present invention may be stored in storage subsystem 706. These software modules or instructions may be executed by processor(s) 702. Storage subsystem 706 may also provide a repository for storing data used in accordance with the present invention. Storage subsystem 706 may comprise memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 700 can be of various types including a personal computer, a portable computer, a workstation, a network computer, a mainframe, a kiosk, or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for communicating with a device, the method comprising:
   determining, with one or more processors associated with one or more computer systems, a set of calls for an interface associated with a device based on a first XML event received from an application;
   receiving, at the one or more computer systems, data in response to invoking the set of determined calls to control the device;
   generating, with the one or more processors associated with the one or more computer systems, a second XML event based on the data and an examination of at least one of a time interval or value condition; and
   communicating, with the one or more processors associated with the one or more computer systems, the second XML event to the application.

2. The method of claim 1 wherein determining the set of calls for the interface comprises translating the first XML event into one or more calls in the set of calls.

3. The method of claim 1 further comprising:
   receiving a data subscription from the application; and
   examining the at least one of a time interval or value condition based on the data subscription.

4. The method of claim 1 wherein:
   receiving the data in response to invoking the set of determined calls to control the device comprises receiving data for each call in a plurality of calls in the set of calls; and
   generating the second XML event comprises aggregating the data for each call in the plurality of calls.

5. The method of claim 1 wherein the first XML event defines a plurality of times; and
   wherein receiving the data in response to invoking the set of determined calls to control the device comprises controlling the device at each of the plurality of times.

6. The method of claim 5 wherein controlling the device comprises reading data from the device.

7. The method of claim 5 wherein controlling the device comprises writing data to the device.

8. A data processing system comprising:
   an interface associated with a device;
   a processor; and
   a memory coupled to the processor, the memory configured to store a set of instructions which when executed by the processor cause the processor to:
      determine a set of calls for the interface based on a first XML event received from an application;
      receive data in response to invoking the set of determined calls to control the device;
      generate a second XML event based on the data and an examination of at least one of a time interval or value condition; and
      communicate the second XML event to the application.

9. The system of claim 8 wherein the processor is caused to translate the first XML event into one or more calls in the set of calls.

10. The system of claim 8 wherein the processor is further caused to:
    receive a data subscription from the application; and
    examine the at least one of a time interval or value condition based on the data subscription.

11. The system of claim 8 wherein the processor is further caused to:
    receive the data in response to invoking the set of determined calls to control the device by receiving data for each call in a plurality of calls in the set of determined calls to control the device; and
    generate the second XML event by aggregating the data for each call in the plurality of calls.

12. The system of claim 8 wherein the second XML event defines a plurality of times; and
    wherein the processor is cause to receive the data in response to invoking the set of determined calls to control the device by controlling the device at each of the plurality of times.

13. The system of claim 8 wherein the processor is caused to receive the first XML event using a web services protocol.

14. The system of claim 8 wherein the processor is caused to receive the first XML event using the hypertext transport protocol (HTTP).

15. A non-transitory computer readable storage medium configured to store a set of code modules which when executed by one or more processors of a computer system cause the processors to communicate with a device, the computer readable medium comprising:
    code for determining a set of calls for an interface associated with a device based on a first XML event received from an application;

code for receiving data in response to invoking the set of determined calls to control the device;

code for generating a second XML event based on the data and an examination of at least one of a time interval or value condition; and code for communicating the second XML event to the application.

16. The non-transitory computer readable storage medium of claim 15 wherein the code for determining the set of calls for the interface comprises code for translating the first XML event into one or more calls in the set of calls.

17. The non-transitory computer readable storage medium of claim 15 further comprising:

code for receiving a data subscription from the application;

code for examining the at least one of a time interval or value condition based on the data subscription.

18. The non-transitory computer readable storage medium of claim 15 wherein:

the code for receiving the data in response to invoking the set of determined calls to control the device comprises code for receiving data for each call in plurality of calls; and the code for generating the second XML event comprises code for aggregating the data for each call in the plurality of calls.

19. The non-transitory computer readable storage medium of claim 15 wherein the second XML event defines a plurality of times; and wherein the code for receiving the data in response to invoking the set of determined calls to control the device comprises code for controlling the device at each of the plurality of times.

20. The non-transitory computer readable storage medium of claim 19 wherein the code for controlling the device comprises code for reading data from the device or writing data to the device.

* * * * *

UNITED STATES PATENT AND TRADEMARK OFFICE
CERTIFICATE OF CORRECTION

| | | |
|---|---|---|
| PATENT NO. | : 8,196,155 B2 | Page 1 of 1 |
| APPLICATION NO. | : 12/247495 | |
| DATED | : June 5, 2012 | |
| INVENTOR(S) | : Huang et al. | |

It is certified that error appears in the above-identified patent and that said Letters Patent is hereby corrected as shown below:

On sheet 3 of 8, in figure 3, Box 370, line 1, delete "BUFER" and insert -- BUFFER --, therefor.

On sheet 4 of 8, in figure 4, Box 410, line 1, delete "RECIEVE" and insert -- RECEIVE --, therefor.

In column 4, line 5, delete "ore" and insert -- or --, therefor.

In column 4, line 5, delete "and or/application" and insert -- and/or application --, therefor.

In column 6, line 60, delete "COM/DOCM" and insert -- COM/DCOM --, therefor.

Signed and Sealed this
Thirtieth Day of October, 2012

David J. Kappos
*Director of the United States Patent and Trademark Office*